US012087104B2

United States Patent
Liu et al.

(10) Patent No.: US 12,087,104 B2
(45) Date of Patent: Sep. 10, 2024

(54) METHOD, SYSTEM, AND DEVICE FOR DIAGNOSING VEHICLE, AND SERVER

(71) Applicant: LAUNCH TECH CO., LTD, Guangdong (CN)

(72) Inventors: Jun Liu, Guangdong (CN); Xiangmin Xu, Guangdong (CN); Jianyong Wen, Guangdong (CN)

(73) Assignee: LAUNCH TECH CO., LTD, Guangdong (CN)

( * ) Notice: Subject to any disclaimer, the term of this patent is extended or adjusted under 35 U.S.C. 154(b) by 0 days.

(21) Appl. No.: 17/295,886

(22) PCT Filed: May 29, 2020

(86) PCT No.: PCT/CN2020/093149
§ 371 (c)(1),
(2) Date: May 21, 2021

(87) PCT Pub. No.: WO2021/237648
PCT Pub. Date: Dec. 2, 2021

(65) Prior Publication Data
US 2024/0071148 A1    Feb. 29, 2024

(51) Int. Cl.
*G07C 5/08* (2006.01)
*G06F 8/65* (2018.01)
*G07C 5/00* (2006.01)

(52) U.S. Cl.
CPC ............ *G07C 5/0808* (2013.01); *G06F 8/65* (2013.01); *G07C 5/008* (2013.01)

(58) Field of Classification Search
CPC .................................................. G07C 5/0808
See application file for complete search history.

(56) References Cited

U.S. PATENT DOCUMENTS 6,405,111 B2 * 6/2002 Rogers ................. H04L 69/329
                                                709/200
9,922,176 B2 * 3/2018 Shetty .................... G06F 21/105
(Continued)

FOREIGN PATENT DOCUMENTS

CN     101751033 A    6/2010
CN     102455700 A    5/2012
(Continued)

OTHER PUBLICATIONS

First Office Action dated Sep. 3, 2021 for Chinese patent application No. 202080001210.6, English translation provided by Global Dossier.
(Continued)

*Primary Examiner* — Michael A Berns
(74) *Attorney, Agent, or Firm* — Yue (Robert) Xu; Apex Attorneys at Law, LLP

(57) ABSTRACT

A method, a system, and a device for diagnosing a vehicle, and a server. The method is applied to a server and includes: receiving vehicle diagnosis request information sent by a vehicle diagnosis device, where the vehicle diagnosis request information includes identity information of a user and a vehicle type; determining whether the user has an authorization of vehicle diagnosis software corresponding to the vehicle type, based on the identity information of the user; returning authorization information, for the vehicle diagnosis device to diagnose a to-be-diagnosed vehicle, if it is determined that the user has the authorization; and returning prompt information to prompt the user to acquire the authorization of the vehicle diagnosis software corresponding to the vehicle type and then to diagnose the to-be-diagnosed vehicle, if it is determined that the user does not have the authorization.

19 Claims, 4 Drawing Sheets

(56) References Cited

U.S. PATENT DOCUMENTS

| | | | |
|---|---|---|---|
| 10,489,132 B1 | 11/2019 | Bloomcamp et al. | |
| 10,706,646 B2* | 7/2020 | Ahn | G07C 5/0808 |
| 11,240,317 B2* | 2/2022 | Xiao | H04L 67/01 |
| 2001/0007086 A1 | 7/2001 | Rogers et al. | |
| 2009/0177352 A1* | 7/2009 | Grau | G07C 5/008 |
| | | | 701/31.4 |
| 2014/0189814 A1* | 7/2014 | Marten | G08G 1/205 |
| | | | 726/4 |
| 2017/0109506 A1 | 4/2017 | Shetty | |
| 2018/0151005 A1 | 5/2018 | Ahn et al. | |
| 2019/0228322 A1* | 7/2019 | Wenner | G07C 5/0808 |

FOREIGN PATENT DOCUMENTS

| | | |
|---|---|---|
| CN | 108268024 A | 7/2018 |
| CN | 109088853 A | 12/2018 |
| CN | 109698862 A | 4/2019 |
| CN | 109933051 A | 6/2019 |
| CN | 110716538 A | 1/2020 |
| CN | 111079132 A | 4/2020 |

OTHER PUBLICATIONS

International Search Report for PCT/CN2020/093149 mailed Mar. 2, 2021, ISA/CN.

\* cited by examiner

METHOD, SYSTEM, AND DEVICE FOR DIAGNOSING VEHICLE, AND SERVER

This application is the national phase of International Application No. PCT/CN2020/093149, titled "METHOD, SYSTEM, AND DEVICE FOR DIAGNOSING VEHICLE, AND SERVER", filed on May 29, 2020, which is incorporated herein by reference in its entirety.

FIELD

The present disclosure relates to the technical field of vehicle diagnosis, and in particular to a method, a system, and a device for diagnosing a vehicle, and a server.

BACKGROUND

Vehicle diagnosis devices are gradually applied in the automotive industry. The vehicle diagnosis device is a portable self-check terminal for vehicle fault detection, and is also referred to as a vehicle fault diagnosis instrument, a vehicle decoder or the like. A user may quickly diagnose a fault in an automotive electronic control system by means of the vehicle diagnosis device, and fault information is displayed on a liquid crystal display screen to help the user identify a position and a cause of the fault.

Functions of the vehicle diagnosis device cannot be realized without vehicle diagnosis software installed in the vehicle diagnosis device. In the conventional technology, a vehicle diagnosis device purchased by a user is bundled with vehicle diagnosis software with all functions (including code reading, code clearing, and diagnosis) for all brands by default. However, as the automotive industry becomes more and more standardized, brand barriers are gradually established for vehicle sales and after-sales. One vehicle dealer (4S shop) basically sells and repairs vehicles of a certain brand or several brands only, and a maintenance technician is basically responsible for after-sales maintenance of certain types of vehicles. That is, most users who purchase the vehicle diagnosis device only diagnose faults for a few fixed vehicle types. While in the conventional technology, default software bundle of the vehicle diagnosis device requires the user to pay for a full set of vehicle diagnosis software, which increases cost of the diagnosis device and vehicle maintenance, and affects the development of the automobile repair industry.

In view of this, those skilled in the art are urgently required to provide solutions to the above technical problems.

SUMMARY

An objective of the present disclosure is to provide a method, a system, and a device for diagnosing a vehicle, and a server, so as to improve flexibility and autonomy of a user in software configuration of a vehicle diagnosis device, and reduce the cost of vehicle diagnosis and maintenance.

In order to solve the above technical problems, in a first aspect, a method for diagnosing a vehicle is disclosed in the present disclosure. The method is applied to a server, and includes:
  receiving vehicle diagnosis request information sent by a vehicle diagnosis device, where the vehicle diagnosis request information includes identity information of a user and a vehicle type;
  determining whether the user has an authorization of vehicle diagnosis software corresponding to the vehicle type, based on the identity information of the user;
  returning authorization information, for the vehicle diagnosis device to diagnose a to-be-diagnosed vehicle, if it is determined that the user has the authorization of the vehicle diagnosis software corresponding to the vehicle type; and
  returning prompt information to prompt the user to acquire the authorization of the vehicle diagnosis software corresponding to the vehicle type and then to diagnose the to-be-diagnosed vehicle, if it is determined that the user does not have the authorization of the vehicle diagnosis software corresponding to the vehicle type.

Another method for diagnosing a vehicle is also disclosed in the present disclosure. The method is applied to a vehicle diagnosis device, and includes:
  acquiring vehicle diagnosis request information of a user, where the vehicle diagnosis request information includes identity information of the user and a vehicle type;
  sending the vehicle diagnosis request information to a server, for the server to determine whether the user has an authorization of vehicle diagnosis software corresponding to the vehicle type;
  receiving authorization information returned by the server and diagnosing a to-be-diagnosed vehicle, if it is determined that the user has the authorization of the vehicle diagnosis software corresponding to the vehicle type; and
  receiving prompt information returned by the server, and acquiring the authorization of the vehicle diagnosis software corresponding to the vehicle type based on the prompt information and then diagnosing the to-be-diagnosed vehicle, if it is determined that the user does not have the authorization of the vehicle diagnosis software corresponding to the vehicle type.

In a second aspect, a system for diagnosing a vehicle is further disclosed in the present disclosure. The system includes:
  a vehicle diagnosis device, configured to: acquire vehicle diagnosis request information of a user, where the vehicle diagnosis request information includes identity information of the user and a vehicle type; send the vehicle diagnosis request information to a server, for the server to determine whether the user has an authorization of vehicle diagnosis software corresponding to the vehicle type; and receive authorization information or prompt information returned by the server, to diagnose a to-be-diagnosed vehicle; and
  the server, configured to: receive the vehicle diagnosis request information sent by the vehicle diagnosis device; determine whether the user has the authorization of the vehicle diagnosis software corresponding to the vehicle type, based on the identity information of the user; and return the authorization information or the prompt information, for the vehicle diagnosis device to diagnose the to-be-diagnosed vehicle.

In a third aspect, a server is further disclosed in the present disclosure. The server includes:
  a memory, configured to store a computer program; and
  a processor, configured to execute the computer program to implement the following steps:
    receive vehicle diagnosis request information sent by a vehicle diagnosis device, where the vehicle diagnosis request information includes identity information of a user and a vehicle type;

determine whether the user has an authorization of vehicle diagnosis software corresponding to the vehicle type, based on the identity information of the user;

return authorization information for the vehicle diagnosis device to diagnose a to-be-diagnosed vehicle, if it is determined that the user has the authorization of the vehicle diagnosis software corresponding to the vehicle type; and return prompt information to prompt the user to acquire the authorization of the vehicle diagnosis software corresponding to the vehicle type and then diagnose the to-be-diagnosed vehicle, if it is determined that the user does not have the authorization of the vehicle diagnosis software corresponding to the vehicle type.

In a fourth aspect, a device for diagnosing a vehicle is further disclosed in the present disclosure. The device includes:

a memory, configured to store a computer program; and a processor, configured to execute the computer program to implement the following steps:

acquire vehicle diagnosis request information of a user, where the vehicle diagnosis request information includes identity information of the user and a vehicle type;

send the vehicle diagnosis request information to a server, for the server to determine whether the user has an authorization of vehicle diagnosis software corresponding to the vehicle type;

receive authorization information returned by the server and diagnosing a to-be-diagnosed vehicle, if it is determined that the user has the authorization of the vehicle diagnosis software corresponding to the vehicle type; and receive prompt information returned by the server, and acquiring the authorization of the vehicle diagnosis software corresponding to the vehicle type based on the prompt information and then diagnosing the to-be-diagnosed vehicle, if it is determined that the user does not have the authorization of the vehicle diagnosis software corresponding to the vehicle type.

It can be seen that in the method for diagnosing a vehicle according to the present disclosure, by means of the server's network communication and configuration management mechanism for the vehicle diagnosis device, the user can autonomously select and purchase software configuration of the vehicle diagnosis device based on actual needs. Thus the flexibility and autonomy of users in software configuration are greatly improved while meeting the needs of the users for vehicle diagnosis, the cost of vehicle diagnosis and maintenance is effectively reduced, and user experience is improved. The system and the device for diagnosing a vehicle as well as the server according to the present disclosure also have the above beneficial effects.

BRIEF DESCRIPTION OF THE DRAWINGS

In order to more clearly illustrate technical solutions in the conventional technology and in embodiments of the present disclosure, the drawings to be used in the conventional technology and in the description of the embodiments of the present disclosure are briefly described below. Apparently, the following drawings related to the embodiments of the present disclosure show only embodiments of the present disclosure, and other drawings may be obtained by those skilled in the art based on the provided drawings without any creative work, and fall within the protection scope of the present disclosure.

DETAILED DESCRIPTION OF THE EMBODIMENTS

A core of the present disclosure is to provide a method, a system, and a device for diagnosing a vehicle, and a server, so as to improve the flexibility and autonomy of users in software configuration of vehicle diagnosis device, and reduce the cost of vehicle diagnosis and maintenance.

In order to describe the technical solutions in the embodiments of the present disclosure clearly and completely, the technical solutions in the embodiments of the present disclosure are described below in conjunction with the drawings in the embodiments of the present disclosure.

The core of functions of the vehicle diagnosis device lies in vehicle diagnosis software installed in the vehicle diagnosis device. Currently, a vehicle diagnosis device purchased by a user is bundled with vehicle diagnosis software with all functions (including code reading, code clearing, and diagnosis) for all brands by default. However, as the automotive industry becomes more and more standardized, brand barriers are gradually established for vehicle sales and after-sales. One vehicle dealer (4S shop) basically sells and repairs vehicles of a certain brand or several brands only, and a maintenance technician is basically responsible for after-sales maintenance of certain types of vehicles. That is, most users who purchase the vehicle diagnosis device only diagnose faults for a few fixed vehicle types. While in the conventional technology, default software bundle of the vehicle diagnosis device requires the user to pay for a full set of vehicle diagnosis software, which increases cost of the diagnosis device and vehicle maintenance, and affects the development of the automobile repair industry. In view of this, technical solutions for vehicle diagnosis are provided in the present disclosure, to effectively solve the above problems.

Figure 1:
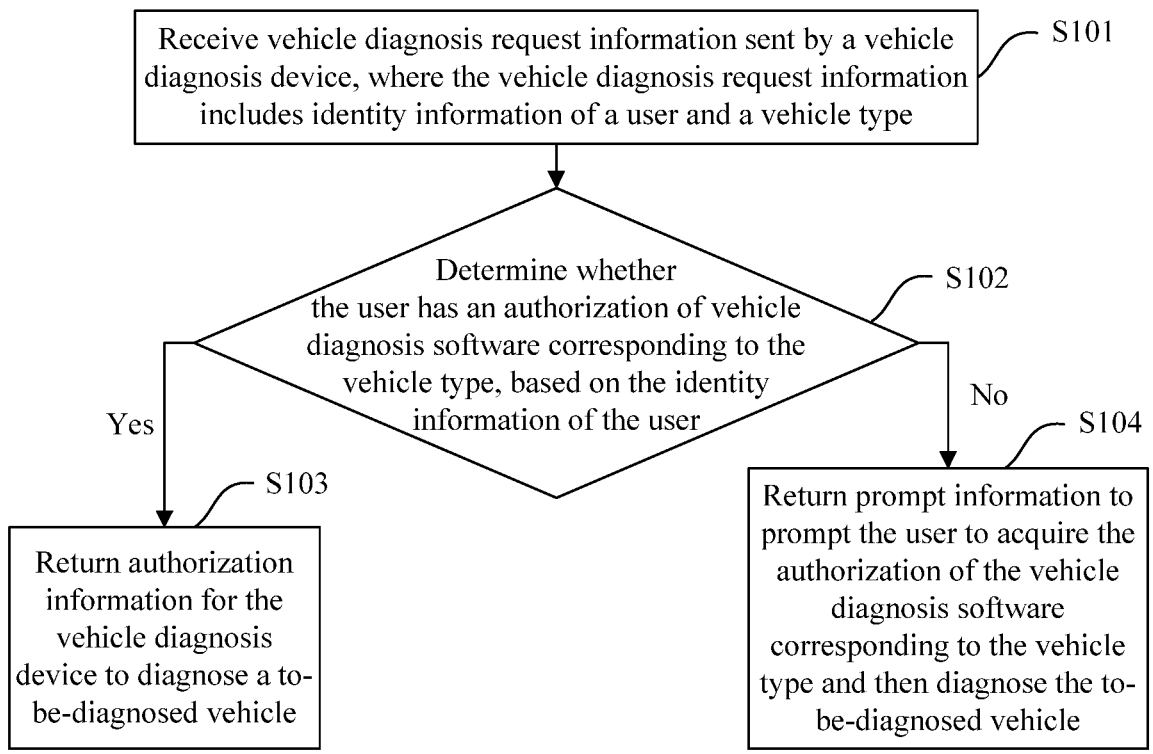
FIG. 1 is a flowchart of a method for diagnosing a vehicle according to an embodiment of the present disclosure.

As shown in FIG. 1, a method for diagnosing a vehicle is provided in an embodiment of the present disclosure. The method is applied to a server, and mainly includes the following steps S101 to S104.

In step S101, vehicle diagnosis request information sent by a vehicle diagnosis device is received. The vehicle diagnosis request information includes identity information of a user and a vehicle type.

The identity information of the user includes but is not limited to, account information, identity card information, driving license number information, or mobile phone number information of the user. Specifically, taken the account information of the user as an example in an embodiment of the present disclosure, the account information of the user may be bundled with a device code of the vehicle diagnosis device. That is, a device code corresponds to a user account. The vehicle type is specifically the vehicle type of the user's to-be-diagnosed vehicle.

Specifically, in the method for diagnosing a vehicle according to the embodiment of the present disclosure, the vehicle diagnosis device is not pre-bundled with vehicle diagnosis software with a full set of functions for all brands (applicable to multiple vehicle types) by default. On the contrary, in the present disclosure, vehicle diagnosis software corresponding to a single vehicle type serving as a unit is authorized to associate with the identity information of the user. That is, after logging in to his/her account and finishing authorization verification, the user may use his/her pre-authorized vehicle diagnosis software corresponding to the vehicle type for vehicle diagnosis.

It should be noted that the vehicle type in the present disclosure includes both of a vehicle brand and a specific vehicle type, specifically referring to as a specific vehicle type (for example, BMW X3, BMW X5 under the brand of BMW) of a specific vehicle brand (such as Honda, Toyota, BMW, Mercedes-Benz, Audi, Dongfeng, BYD, Volkswagen and the like).

Further, based on a basic framework of the vehicle diagnosis software, diagnosis programs applicable to different vehicle types may be integrated into one vehicle diagnosis software. It is easy to understand that vehicle diagnosis software applicable to different types of vehicles is different. In this way, when it is required to perform a vehicle diagnosis on a specified vehicle type, it is possible to only configure the vehicle diagnosis device with the vehicle diagnosis software corresponding to the vehicle type in the present disclosure, and there is no need to vehicle diagnosis software of other vehicle types or general vehicle diagnosis software.

For example, users such as vehicle repair shops, maintenance technicians, or vehicle owners, after purchasing hardware of the vehicle diagnosis device, may acquire an authorization of vehicle diagnosis software corresponding to their vehicle types based on their own needs. In this way, the user is totally unnecessary to acquire an authorization of vehicle diagnosis software corresponding to some vehicle types that the user does not actually use (for example, vehicle diagnosis software that is only applicable to other vehicle types rather than the user's to-be-diagnosed vehicle), which greatly reduces the cost of vehicle diagnosis.

Therefore, as a specific embodiment, the vehicle diagnosis device may automatically identify and acquire a vehicle type of a to-be-diagnosed vehicle. The vehicle diagnosis device acquires a Vehicle Identification Number (VIN) of the to-be-diagnosed vehicle, and parses the VIN to acquire a vehicle type information of the to-be-diagnosed vehicle.

In step S102, it is determined whether the user has an authorization of vehicle diagnosis software corresponding to the vehicle type, based on the identity information of the user. Proceed to step S103 if it is determined that the user has the authorization of the vehicle diagnosis software corresponding to the vehicle type. Proceed to step S104 if it is determined that the user does not have the authorization of the vehicle diagnosis software corresponding to the vehicle type.

Specifically, a server is used for authorization management of the vehicle diagnosis software. A user may log in to an account in advance and acquire an authorization of vehicle diagnosis software corresponding to a specified vehicle type in a certain authorization way. In the present disclosure, the way for the user to acquire an authorization of vehicle diagnosis software corresponding to a certain vehicle type includes but is not limited to, self-purchase, time-sharing lease, transfer by others, and promotional gifts from manufacturers. Then, when a vehicle diagnosis is needed, the vehicle diagnosis device may acquire the identity information of the user and the vehicle type of the to-be-diagnosed vehicle, and send the vehicle diagnosis request information to the server, for the server to determine whether the user has an authorization of vehicle diagnosis software corresponding to the requested vehicle type.

In step S103, authorization information is returned, for the vehicle diagnosis device to diagnose the to-be-diagnosed vehicle.

Specifically, if the user has acquired the authorization of the vehicle diagnosis software corresponding to the vehicle type, the server sends the authorization information to the vehicle diagnosis device, for the vehicle diagnosis device to diagnose the vehicle.

In step S104, prompt information is returned to prompt the user to acquire the authorization of the vehicle diagnosis software corresponding to the vehicle type and then diagnose the to-be-diagnosed vehicle.

Specifically, if the user has not acquired the authorization of the vehicle diagnosis software corresponding to the vehicle type, it indicates that a vehicle type purchased by the user is not consistent with the vehicle type specified in the vehicle diagnosis request information, or the user has not acquired authorization of vehicle diagnosis software corresponding to any vehicle type. In this case, the server sends prompt information to the vehicle diagnosis device, to prompt the user to perform a corresponding authorization operation.

It can be seen that in the method for diagnosing a vehicle according to the present disclosure, by means of the server's software authorization management function, as well as network communication and configuration management with the vehicle diagnosis device, the user can select, based on actual needs, vehicle diagnosis software corresponding to the specific vehicle type, to perform software configuration on the vehicle diagnosis device. Thus the flexibility, convenience, and autonomy of users in software configuration are greatly improved while meeting the needs of the users for vehicle diagnosis, the cost of vehicle diagnosis is effectively reduced, and user experience is improved.

In a specific embodiment, the user logs in to the vehicle diagnosis device with a user account 'admin007', and is to diagnose to-be-diagnosed vehicles A and B. A VIN of the to-be-diagnosed vehicle A is LBVTZ0100LSU31106, and it may be determined that a vehicle type is BMW X3 based on the VIN. A VIN of the to-be-diagnosed vehicle B is WBAKR0105J0Z49054, and it may be determined that a vehicle type is BMW X5 based on the VIN.

Now, connect the vehicle diagnosis device to the to-be-diagnosed vehicle A. After acquiring the VIN of the to-be-diagnosed vehicle A, the vehicle diagnosis device identifies that the vehicle type of the to-be-diagnosed vehicle A is BMW X3, and sends account information of the user and vehicle type information of the to-be-diagnosed vehicle A to the server. The server queries that the account information of the user corresponds to having an authorization of diagnosis software corresponding to the vehicle type (BMW X3), and then sends authorization information to the vehicle diagnosis device, to instruct the vehicle diagnosis device to complete diagnosis operation on the to-be-diagnosed vehicle A.

Now, connect the vehicle diagnosis device to the to-be-diagnosed vehicle B. After acquiring the VIN of the to-be-diagnosed vehicle B, the vehicle diagnosis device identifies that the vehicle type of the to-be-diagnosed vehicle B is BMW X5, and sends the account information of the user and vehicle type information of the to-be-diagnosed vehicle B to the server. The server queries that the account information of the user corresponds to having no authorization of diagnosis software corresponding to the vehicle type (BMW X5), and then sends prompt information to the vehicle diagnosis device, to prompt the vehicle diagnosis device to acquire the authorization of diagnosis software corresponding to the vehicle type. The way to acquire the authorization of the diagnosis software includes time-sharing lease, transfer by others, promotional gifts from manufacturers, and the like.

As a specific embodiment, based on the above contents, in the method for diagnosing a vehicle according to the embodiment of the present disclosure, determining whether the user has an authorization of vehicle diagnosis software corresponding to the vehicle type includes:

acquiring an authorization record of the server;
determining whether the identity information of the user and the vehicle type match the authorization record;
determining that the user has the authorization of the vehicle diagnosis software corresponding to the vehicle type, if it is determined that the identity information of the user and the vehicle type match the authorization record; and
determining that the user does not have the authorization of the vehicle diagnosis software corresponding to the vehicle type, if it is determined that the identity information of the user and the vehicle type do not match the authorization record.

Specifically, in this embodiment, the server may generate the authorization record locally when performing an authorization management on the vehicle diagnosis software, so as to record specific authorization status of different users for vehicle diagnosis software of different vehicle types. Since the vehicle diagnosis software for which the user has obtained authorization corresponds to the vehicle type, if the vehicle type in the vehicle diagnosis request information matches the vehicle diagnosis software for which the user has obtained authorization, it may be determined that the authorization verification is successful; otherwise, it may be determined that the authorization verification fails.

For example, if the user has obtained an authorization of vehicle diagnosis software applicable to BMW X3, while the vehicle type specified in the vehicle diagnosis request information is Honda Odyssey or BMW X5, then it may be determined that the authorization verification fails.

As a specific embodiment, based on the above contents, the authorization record includes authorization time-limit information of the vehicle diagnosis software corresponding to the vehicle type; after determining that the user has the authorization of the vehicle diagnosis software corresponding to the vehicle type, the method for diagnosing a vehicle according to the embodiment of the present disclosure further includes:

determining whether an authorization time-limit is valid at current time;
determining that the user has the authorization of the vehicle diagnosis software corresponding to the vehicle type, if it is determined that the authorization time-limit is valid at the current time; and
generating prompt information indicating that the authorization time-limit has expired and sending the prompt information indicating that the authorization time-limit has expired to the vehicle diagnosis device, if it is determined that the authorization time-limit is invalid at the current time.

Specifically, in this embodiment, the authorization of vehicle diagnosis software of various vehicle types acquired by the user has timeliness, and the authorization acquired by the user is only valid within the authorization time-limit. When the authorization time-limit expires, the authorization automatically becomes invalid. Taking the vehicle diagnosis request information including user account information and vehicle type information as an example, the vehicle diagnosis request information includes a vehicle type of BMW X3 and requested usage period from 14:00 on Apr. 5, 2020 to 18:00 on Apr. 5, 2020. First, it is determined based on the vehicle type that the vehicle diagnosis software corresponding to the vehicle type is diagnosis software of BMW X3. The server queries that authorization information of the vehicle diagnosis software corresponding to the user account information are as follows: authorized vehicle diagnosis software is diagnosis software of BMW X3, and the authorization time-limit is from 19:00 on Apr. 4, 2020 to 19:00 on Apr. 5, 2020. Then, it is further analyzed and found that a vehicle type of the to-be-diagnosed vehicle is BMW X3, thus it is determined that the vehicle type matches the authorized vehicle diagnosis software, and the requested usage period is within the authorization time-limit. Therefore, it may be determined that the to-be-diagnosed vehicle (BMW X3) has the authorization of the vehicle diagnosis software corresponding to the vehicle type.

If the server queries through the VIN of the vehicle that, in authorization information of the diagnosis software, the authorized vehicle diagnosis software corresponds to BMW X5 and the authorization time-limit is from 8:00 on Apr. 5, 2020 to 8:00 on Apr. 6, 2020, it may be determined based on analysis that the vehicle type of the to-be-diagnosed vehicle does not match the authorized diagnosis software. Therefore, it is determined that the target vehicle does not have the authorization of the vehicle diagnosis software corresponding to the vehicle type.

Alternatively, if the server queries through the VIN of the vehicle that, in authorization information of the diagnosis software, the authorized vehicle diagnosis software corresponds to BMW X3 and the authorization time-limit is from 10:00 on Apr. 3, 2020 to on Apr. 4, 2020, it may be determined based on analysis that the vehicle type of the to-be-diagnosed vehicle matches the authorized diagnosis software but the requested usage period is not within the authorization time-limit. Therefore, it is determined that the to-be-diagnosed vehicle does not have the authorization of the vehicle diagnosis software corresponding to the vehicle type.

Therefore, after determining that the user has indeed obtained the authorization of the vehicle diagnosis software corresponding to the vehicle type, the server may verify the timeliness of the authorization information. If the current time is within the authorization time-limit, the authorization is valid; if the current time is not within the authorization time-limit, the authorization is invalid. After determining that the authorization is invalid, the server may generate the prompt information indicating that the authorization time-limit has expired and send the prompt information to the vehicle diagnosis device, for the user to regain the authorization.

As a specific embodiment, based on the above contents, after determining that the authorization time-limit is valid at the current time, the method for diagnosing a vehicle according to the embodiment of the present disclosure further includes:

determining whether a remaining validity period in the authorization time-limit is less than a preset threshold; and generating prompt information for renewing the authorization time-limit and sending the prompt information for renewing the authorization time-limit to the vehicle diagnosis device, if it is determined that the remaining validity period in the authorization time-limit is less than the preset threshold.

Specifically, in this embodiment, the user may be reminded in advance before the authorization time-limit is about to expire. For example, those skilled in the art may set the preset threshold to be one month (assuming that a total validity period is one year), and when one month is left before the end of the validity period, it may be generated the prompt information for renewing the authorization time-limit, to prompt the user to renew authorization service in time.

As a specific embodiment, based on the above contents, the authorization information further includes authorization version information of the vehicle diagnosis software corresponding to the vehicle type, and after determining that the user currently using the vehicle diagnosis device has a valid authorization of the vehicle diagnosis software corresponding to the vehicle type, the method for diagnosing a vehicle according to the embodiment of the present disclosure further includes:

determining whether there is a new version currently based on the authorization version information; and pushing version upgrade information to the vehicle diagnosis device, if there is a new version.

Specifically, in this embodiment, version management is also performed on the vehicle diagnosis software for which the user has the authorization. The authorization information sent by the server to the vehicle diagnosis device further includes authorization version information, which reflects version information of the vehicle diagnosis software for which the user has obtained the authorization. If the current account of the user has a valid authorization of the vehicle diagnosis software corresponding to the vehicle type, it may be further determined whether there is a new version currently, so as to push the version upgrade information to the vehicle diagnosis device in time for the user to upgrade. The valid authorization means that the authorization time-limit is valid at the current time.

As a specific embodiment, based on the above contents, in the method for diagnosing a vehicle according to the embodiment of the present disclosure, the authorization information further includes version upgrade authority information of the vehicle diagnosis software corresponding to the vehicle type, and the pushing version upgrade information to the vehicle diagnosis device includes:

determining whether there is version upgrade authority based on the version upgrade authority information;

pushing the version upgrade information to the vehicle diagnosis device, if it is determined that there is the version upgrade authority; and sending prompt information for applying for the version upgrade authority to the vehicle diagnosis device, if it is determined that there is no version upgrade authority.

Specifically, in this embodiment, the version management service provided for the vehicle diagnosis software for which the user has the authorization includes version upgrade authority management. In addition to the authorization version information, version upgrade authority information is further included in the authorization information sent by the server to the vehicle diagnosis device. The version upgrade authority information reflects whether the user can enjoy the software version upgrade service. If there is a new version of the vehicle diagnosis software, the version upgrade information is pushed to the vehicle diagnosis device for the user to complete version upgrade only when the user has the upgrade authority.

For example, if a user A purchases a version 1.0 of the vehicle diagnosis software of BMW X3, while the newest vehicle diagnosis software of BMW X3 is currently updated to version 2.0, thus the vehicle diagnosis device may make a determination based on the version upgrade authority information sent by the server. If the user A has the version upgrade authority, the vehicle diagnosis software is upgraded for vehicle diagnose. The upgrade of a new version of the vehicle diagnosis software may be acquired by purchase, or by authorization (including lease and gift) from user B who has the authority for the new version of the software. If the user A has no version upgrade authority, the user A still uses the old version 1.0 of the software for vehicle diagnose.

As a specific embodiment, based on the above contents, after pushing the version upgrade information to the vehicle diagnosis device, the method for diagnosing a vehicle according to the embodiment of the present disclosure further includes:

receiving a version upgrade request sent by the vehicle diagnosis device; and sending an installation package of the new version to the vehicle diagnosis device, for the vehicle diagnosis device to complete version upgrade.

Further, in this embodiment, the version upgrade process of the vehicle diagnosis software is specifically as follows. After the server determines that there is a new version of the vehicle diagnosis software, the vehicle diagnosis device sends a version upgrade request to the server, and the server sends an installation package of the new version to the vehicle diagnosis device, for the vehicle diagnosis device to complete version upgrade of the software.

As a specific embodiment, based on the above contents, after sending the prompt information for applying for the version upgrade authority to the vehicle diagnosis device, the method for diagnosing a vehicle according to the embodiment of the present disclosure further includes:

receiving a version upgrade request sent by the vehicle diagnosis device; and unlocking the version upgrade authority based on the version upgrade request; and sending an installation package of the new version to the vehicle diagnosis device, for the vehicle diagnosis device to complete the version upgrade.

Specifically, in this embodiment, the version management service provided for the vehicle diagnosis software for which the user has the authorization includes version upgrade authority management. If the user has the version upgrade authority, the server may respond to the version upgrade request sent by the vehicle diagnosis device; if the user has no version upgrade authority, the server may send the prompt information for applying for the version upgrade authority to the vehicle diagnosis device, for the user to update the version upgrade authority.

Specifically, when receiving the version upgrade request from the vehicle diagnosis device, the server unlocks the version upgrade authority based on the version upgrade request, and sends the installation package of the new version to the vehicle diagnosis device, for the vehicle diagnosis device to complete the version upgrade. When receiving no version upgrade request from the vehicle diagnosis device, which means that the user does not make a selection or response to the prompt information for applying for the version upgrade authority, then the server does not respond and the vehicle diagnosis device cannot complete the version upgrade. For vehicle diagnosis device without version upgrade, it may be used the old version of the vehicle diagnosis software for vehicle diagnosis. Further, after the user acquires the version upgrade authority, the authorization record of the server is required to be updated in detail accordingly.

As a specific embodiment, based on the above contents, after determining that the user has the authorization, the method for diagnosing a vehicle according to the embodiment of the present disclosure further includes:

sending an installation package of an authorized vehicle diagnosis software to the vehicle diagnosis device, for the vehicle diagnosis device to complete software configuration and then start the vehicle diagnosis software to diagnose the to-be-diagnosed vehicle.

Specifically, in this embodiment, the vehicle diagnosis software in the vehicle diagnosis device is deleted immediately after being used. A user who completes the authorization verification is required to download a security package of the vehicle diagnosis software from the server every time when using the vehicle diagnosis device to diagnose the vehicle. After completing this diagnosis, the downloaded and configured vehicle diagnosis software becomes invalid or is deleted immediately.

As a specific embodiment, based on the above contents, after determining that the user has the authorization, the method for diagnosing a vehicle according to the embodiment of the present disclosure further includes:

sending a dynamic key to the vehicle diagnosis device, for the vehicle diagnosis device to pass security verification and then start the authorized vehicle diagnosis software provided in the vehicle diagnosis device to diagnose the to-be-diagnosed vehicle.

Specifically, in this embodiment, the vehicle diagnosis software downloaded and installed after being authorized may be always configured in the vehicle diagnosis device for convenient and quick calling. In order to protect rights of the user and security of use, security verification may be performed on the vehicle diagnosis device through the dynamic key, so that the vehicle diagnosis software may be called after the security verification is passed.

As a specific embodiment, based on the above contents, after determining that the user has the authorization, the method for diagnosing a vehicle according to the embodiment of the present disclosure further includes:

sending authorization information to the vehicle diagnosis device, where the authorization information includes authorization time-limit information of the vehicle diagnosis software corresponding to the vehicle type, for the vehicle diagnosis device to diagnose the to-be-diagnosed vehicle in determining that an authorization time-limit is valid at current time, and generating prompt information indicating that the authorization time-limit has expired in determining that the authorization time-limit is invalid at the current time.

Specifically, in this embodiment, the vehicle diagnosis software that is downloaded and installed after being authorized may also be configured in the vehicle diagnosis device for a long time until the authorization time-limit expires, so as to facilitate rapid calling. In order to protect the rights of the user and the security of use, the vehicle diagnosis software that is installed and configured in the vehicle diagnosis device is only allowed to be called within a validity period of the authorization time-limit. Once the authorization time-limit expires, prompt information that the authorization time-limit has expired may be generated to prompt the user. The user may respond to the prompt information that the authorization time-limit has expired, with regard to whether to regain the authorization or extend the authorization time-limit, alternatively, the user may ignore the prompt information that the authorization time-limit has expired. After the authorization is regained or the authorization time-limit is extended, the authorization record of the server needs to be updated accordingly.

Figure 2:
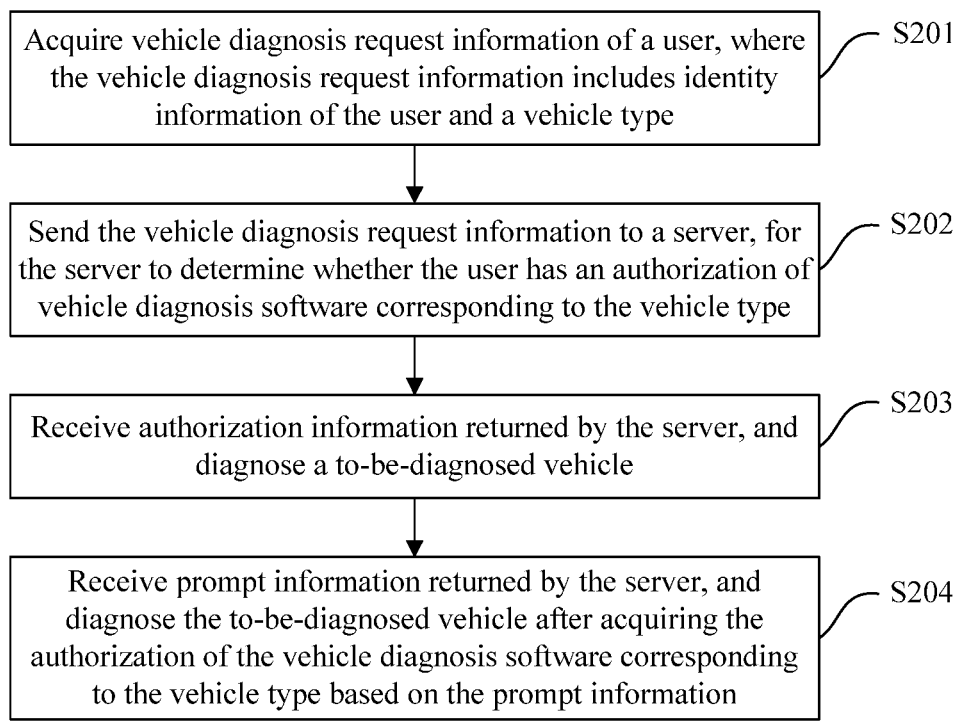
FIG. 2 is a flowchart of a method for diagnosing a vehicle according to another embodiment of the present disclosure.

As shown in FIG. 2, a method for diagnosing a vehicle is provided according to another embodiment of the present disclosure. The method is applied to a vehicle diagnosis device, and mainly includes the following steps S201 to S204.

In step S201, vehicle diagnosis request information of a user is acquired. The vehicle diagnosis request information includes identity information of the user and a vehicle type.

Specifically, the way to acquire the vehicle diagnosis request information includes but is not limited to, the user inputs a desired diagnosis request, and the vehicle diagnosis device connects to an On Board Diagnostics (OBD) and automatically identifies and acquires a desired diagnosis request.

In step S202, the vehicle diagnosis request information is sent to a server, for the server to determine whether the user has an authorization of vehicle diagnosis software corresponding to the vehicle type. Proceed to step S203 if it is determined that the user has the authorization of the vehicle diagnosis software corresponding to the vehicle type; proceed to step S204 if it is determined that the user does not have the authorization of the vehicle diagnosis software corresponding to the vehicle type.

In step S203, authorization information returned by the server is received and a to-be-diagnosed vehicle is diagnosed.

In step S204, prompt information returned by the server is received, the to-be-diagnosed vehicle is diagnosed after the authorization of the vehicle diagnosis software corresponding to the vehicle type is acquired based on the prompt information.

It can be seen that in the method for diagnosing a vehicle according to the present disclosure, by means of the server's software authorization management function, as well as network communication and configuration management with the vehicle diagnosis device, the user can select, based on actual needs, vehicle diagnosis software corresponding to the specific vehicle type, to perform software configuration on the vehicle diagnosis device. Thus the flexibility, convenience, and autonomy of users in software configuration are greatly improved while meeting the needs of the users for vehicle diagnosis, the cost of vehicle diagnosis is effectively reduced, and user experience is improved.

In a specific embodiment, the user logs in to the vehicle diagnosis device with a user account 'admin007', and is to diagnose to-be-diagnosed vehicles A and B. A VIN of the to-be-diagnosed vehicle A is LBVTZ0100LSU31106, and it may be determined that a vehicle type is BMW X3 based on the VIN. A VIN of the to-be-diagnosed vehicle B is WBAKR0105J0Z49054, and it may be determined that a vehicle type is BMW X5 based on the VIN.

Now, connect the vehicle diagnosis device to the to-be-diagnosed vehicle A. After acquiring the VIN of the to-be-diagnosed vehicle A, the vehicle diagnosis device identifies that the vehicle type of the to-be-diagnosed vehicle A is BMW X3, and sends account information of the user and vehicle type information of the to-be-diagnosed vehicle A to the server. The server queries that the account information of the user corresponds to having an authorization of diagnosis software corresponding to the vehicle type (BMW X3), and then sends authorization information to the vehicle diagnosis device, to instruct the vehicle diagnosis device to complete diagnosis operation on the to-be-diagnosed vehicle A.

Now, connect the vehicle diagnosis device to the to-be-diagnosed vehicle B. After acquiring the VIN of the to-be-diagnosed vehicle B, the vehicle diagnosis device identifies that the vehicle type of the to-be-diagnosed vehicle B is BMW X5, and sends the account information of the user and vehicle type information of the to-be-diagnosed vehicle B to the server. The server queries that the account information of the user corresponds to having no authorization of diagnosis software corresponding to the vehicle type (BMW X5), and then sends prompt information to the vehicle diagnosis device, to prompt the vehicle diagnosis device to acquire the authorization of diagnosis software corresponding to the vehicle type. The way to acquire the authorization of the diagnosis software includes time-sharing lease, transfer by others, promotional gifts from manufacturers, and the like.

In addition, the user may manually operate the vehicle diagnosis device, and write the VIN or the vehicle type of the to-be-diagnosed vehicle after logging in to the vehicle diagnosis device. If the user knows the vehicle type of the to-be-diagnosed vehicle, the user may directly write the vehicle type, and then acquire authorization information of the vehicle diagnosis software. Alternatively, after the VIN of the to-be-diagnosed vehicle is written, the diagnosis device automatically identifies and parses to acquire the vehicle type. Specific parse and subsequent processing flow may refer to the above embodiments.

As a specific embodiment, based on the above contents, in the method for diagnosing a vehicle according to the embodiment of the present disclosure, after the authorization information returned by the server is received, diagnosing the to-be-diagnosed vehicle further includes:

completing software configuration based on an installation package of the vehicle diagnosis software sent by the server, to start the vehicle diagnosis software to diagnose the to-be-diagnosed vehicle; where the vehicle diagnosis software is deleted immediately after the vehicle diagnosis is completed.

As a specific embodiment, based on the above contents, in the method for diagnosing a vehicle according to the embodiment of the present disclosure, after the authorization information returned by the server is received, diagnosing the to-be-diagnosed vehicle includes:

starting vehicle diagnosis software provided at time of first authorization by the vehicle diagnosis device, to diagnose the to-be-diagnosed vehicle; where the vehicle diagnosis software is deleted after the authorization has expired.

As a specific embodiment, based on the above contents, in the method for diagnosing a vehicle according to the embodiment of the present disclosure, after the authorization information returned by the server is received, diagnosing the to-be-diagnosed vehicle includes:

performing security verification based on a dynamic key sent by the server; and
starting the vehicle diagnosis software provided at time of first authorization by the vehicle diagnosis device, to diagnose the to-be-diagnosed vehicle, in a case that the security verification is passed, where the dynamic key is deleted after authorization expires.

Figure 3:
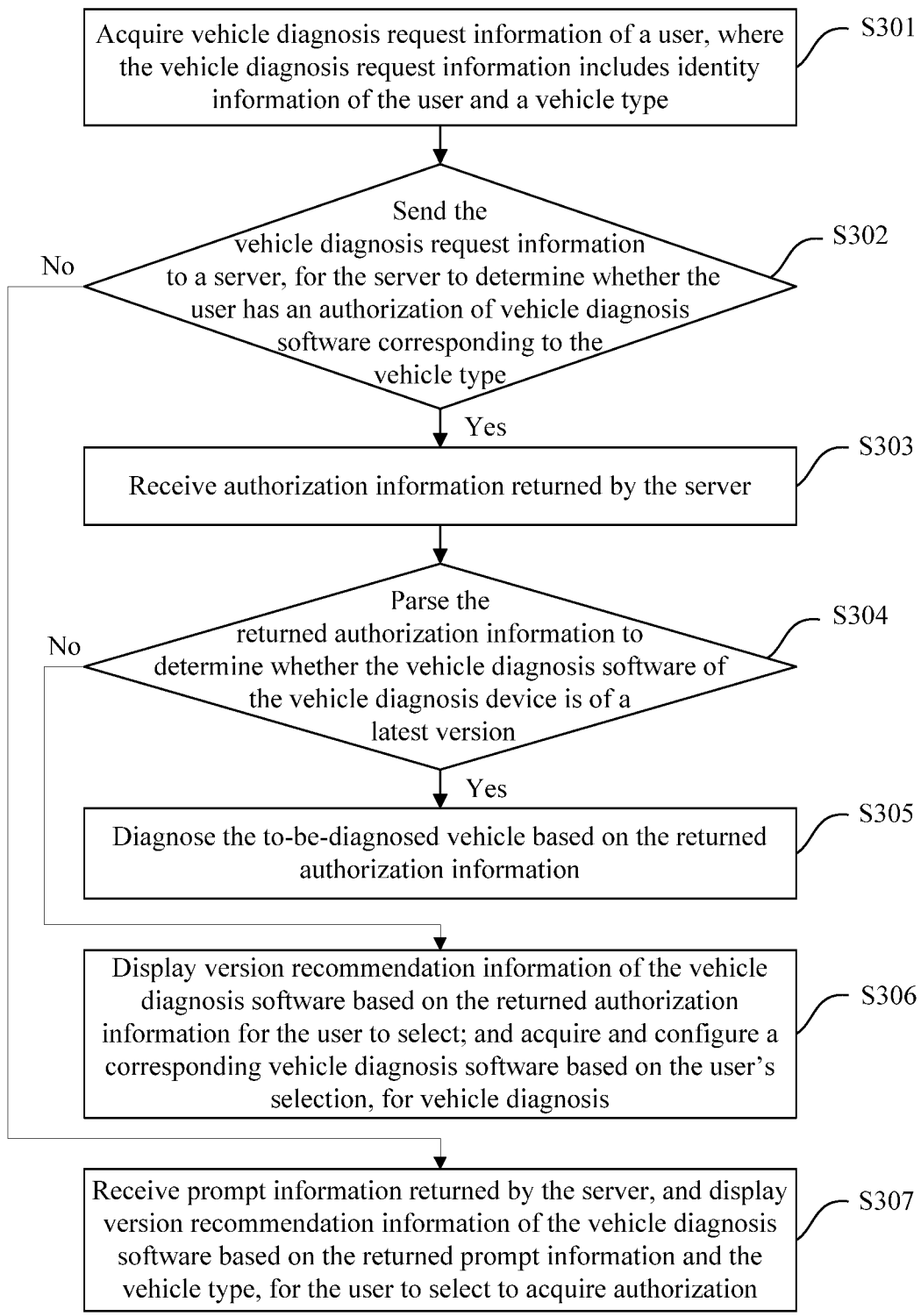
FIG. 3 is a flowchart of a method for diagnosing a vehicle according to another embodiment of the present disclosure.

As shown in FIG. 3, a method for diagnosing a vehicle is provided in another embodiment of the present disclosure. The method is applied to a vehicle diagnosis device and mainly includes the following steps S301 to S307.

In step S301, vehicle diagnosis request information of a user is acquired. The vehicle diagnosis request information includes identity information of the user and a vehicle type.

In step S302, the vehicle diagnosis request information is sent to a server, for the server to determine whether the user has an authorization of vehicle diagnosis software corresponding to the vehicle type. Proceed to step S303 if it is determined that the user has the authorization of the vehicle diagnosis software corresponding to the vehicle type; proceed to step S307 if it is determined that the user does not have the authorization of the vehicle diagnosis software corresponding to the vehicle type.

In step S303, authorization information returned by the server is received, and proceed to step S304.

In step S304, the returned authorization information is parsed, to determine whether the vehicle diagnosis software in the vehicle diagnosis device is of a latest version; proceed to step S305 if it is determined that the vehicle diagnosis software in the vehicle diagnosis device is of the latest version; proceed to step S306 if it is determined that the vehicle diagnosis software in the vehicle diagnosis device is not of the latest version.

Specifically, in this embodiment, version management is performed on the vehicle diagnosis software for which the user has the authorization. The authorization information sent by the server to the vehicle diagnosis device includes authorization version information. If the user has a valid authorization for the vehicle diagnosis software corresponding to the vehicle type at current time, it may be further determined whether there is a new version currently, so as to push the version upgrade information to the vehicle diagnosis device in time, for the user's upgrade.

In step S305, the to-be-diagnosed vehicle is diagnosed based on the returned authorization information.

Specifically, if the vehicle diagnosis software currently installed in the vehicle diagnosis device is of the latest version, it may be directly started the vehicle diagnosis software to diagnose the to-be-diagnosed vehicle.

In step S306, version recommendation information of the vehicle diagnosis software is displayed based on the returned authorization information for the user to select, and it may be acquired and configured vehicle diagnosis software based on selection of the user, for the vehicle diagnosis.

Specifically, if the vehicle diagnosis software currently installed in the vehicle diagnosis device is not of the latest version, the version recommendation information may be pushed to the vehicle diagnosis software, for the user to determine whether to upgrade to the new version of the vehicle diagnosis software for the vehicle diagnosis.

Further, a version upgrade process of the vehicle diagnosis software is specifically as follows. Based on a selection result of the user, the vehicle diagnosis device sends a version upgrade request to the server. After receiving an installation package of the new version sent by the server, the vehicle diagnosis device upgrades the version of the vehicle diagnosis software.

Based on the above, the authorization information may further include version upgrade authority information of the vehicle diagnosis software corresponding to the vehicle type. Therefore, after determining that there is a new version of the vehicle diagnosis software currently, the server further determines whether the user has a version upgrade authority. If the user has the version upgrade authority, the server pushes version recommendation information to the vehicle diagnosis device and processes the version upgrade request. If the user does not have the version upgrade authority, the server pushes prompt information for applying for the version upgrade authority to the vehicle diagnosis device, for the user to apply for the version upgrade authority.

Similarly, the version upgrade authority of the vehicle diagnosis software may be acquired by any of the following ways: purchase, lease, transfer or the like.

In step S307, prompt information returned by the server is received, and version recommendation information of the vehicle diagnosis software is displayed based on the returned prompt information and the vehicle type, for the user to select to acquire the authorization.

Specifically, in this embodiment, after the server determines that the user does not have the authorization of the vehicle diagnosis software corresponding to the vehicle type, the vehicle diagnosis device may display the version recommendation information of the vehicle diagnosis software applicable to the to-be-diagnosed vehicle to the user in order to facilitate authorization of the user, thereby eliminating search of the user, helping the user achieve "one-key configuration", and greatly improving configuration efficiency.

After receiving the prompt information sent by the server, the vehicle diagnosis device automatically searches, based on the vehicle type of the to-be-diagnosed vehicle, to get a matched vehicle diagnosis software and version information of the vehicle diagnosis software.

In practice, take the vehicle diagnosis device to acquire the user's vehicle diagnosis request information on the BMW X3 as an example. The vehicle diagnosis device acquires a vehicle type of the to-be-diagnosed vehicle by parsing the VIN of the to-be-diagnosed vehicle, generates an acquisition request of target diagnosis software based on the vehicle type and the identity information of the user and sends the acquisition request to the server. If the server determines that the user has the authorization, the vehicle diagnosis device will receive the authorization information, that is, an installation package of diagnosis software for the BMW X3, returned by the server. After receiving the installation package, the vehicle diagnosis device configures the vehicle diagnosis software of the vehicle type and then may use the vehicle diagnosis software. If the server determines that the user foes not have the authorization, the vehicle diagnosis device will receive prompt information of "You do not have the authorization of diagnosis software for BMW X3, and please acquire an authorization" sent by the server. In a case that the user determines to acquire the authorization, multiple ways to acquire the authorization, such as purchase, time-sharing lease, lease, and transfer from others, are displayed on an interface of the vehicle diagnosis device. After the user selects one of the ways and completes the authorization, the server sends the vehicle diagnosis software corresponding to the authorization to the vehicle diagnosis device, for the vehicle diagnosis device to configure and use the vehicle diagnosis software for the vehicle type.

Specific contents of the method for diagnosing a vehicle applied to the vehicle diagnosis device may refer to the details of method for diagnosing a vehicle applied to the server described above, which will not be repeated here.

Figure 4:
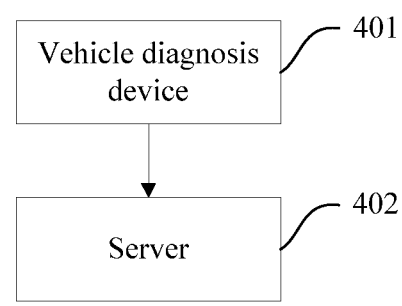
FIG. 4 is a structural block diagram of a system for diagnosing a vehicle according to an embodiment of the present disclosure.

As shown in FIG. 4, a system for diagnosing a vehicle is further disclosed in the present disclosure. The system includes:

a vehicle diagnosis device 401, configured to: acquire vehicle diagnosis request information of a user, where the vehicle diagnosis request information includes identity information of the user and a vehicle type; send the vehicle diagnosis request information to a server, for the server to determine whether the user has an authorization of vehicle diagnosis software corresponding to the vehicle type; and receive authorization information or prompt information returned by the server, to diagnose a to-be-diagnosed vehicle; and the server 402, configured to: receive the vehicle diagnosis request information sent by the vehicle diagnosis device; determine whether the user has the authorization of the vehicle diagnosis software corresponding to the vehicle type based on the identity information of the user; and return the authorization information or the prompt information, for the vehicle diagnosis device to diagnose the to-be-diagnosed vehicle.

A server is further disclosed in the present disclosure. The server includes:

a memory is configured to store a computer program; and a processor, configured to execute the computer program to implement the following steps:

receive vehicle diagnosis request information sent by a vehicle diagnosis device, where the vehicle diagnosis request information includes identity information of a user and a vehicle type;

determine whether the user has an authorization of vehicle diagnosis software corresponding to the vehicle type, based on the identity information of the user;

return authorization information for the vehicle diagnosis device to diagnose a to-be-diagnosed vehicle, if it is determined that the user has the authorization of the vehicle diagnosis software corresponding to the vehicle type; and return prompt information to prompt the user to acquire the authorization of the vehicle diagnosis software corresponding to the vehicle type and then diagnose the to-be-diagnosed vehicle, if it is determined that the user does not have the authorization of the vehicle diagnosis software corresponding to the vehicle type.

In a specific embodiment, the processor is configured to implement the following steps when executing a computer sub-program stored in the memory:

acquire an authorization record of the server;

determine whether the identity information of the user and the vehicle type match the authorization record;

determine that the user has the authorization of the vehicle diagnosis software corresponding to the vehicle type, if it is determined that the identity information of the user and the vehicle type match the authorization record; and determine that the user does not have the authorization of the vehicle diagnosis software corresponding to the vehicle type, if it is determined that the identity information of the user and the vehicle type do not match the authorization record.

In a specific embodiment, the authorization record includes authorization time-limit information of the vehicle diagnosis software corresponding to the vehicle type. The processor is configured to implement the following steps when executing a computer sub-program stored in the memory:

determine whether the authorization time-limit is valid at current time, after it is determined that the user has the authorization of the vehicle diagnosis software corresponding to the vehicle type;

determine that the user has the authorization of the vehicle diagnosis software corresponding to the vehicle type, if it is determined that the authorization time-limit is valid at the current time; and generate prompt information indicating that the authorization time-limit has expired and sending the prompt information indicating that the authorization time-limit has expired to the vehicle diagnosis device, if it is determined that the authorization time-limit is invalid at the current time.

In a specific embodiment, the processor is configured to implement the following steps when executing a computer sub-program stored in the memory:
  determine whether a remaining validity period in the authorization time-limit is less than a preset threshold, after it is determined that the authorization time-limit is valid at the current time; and
  generate prompt information for renewing the authorization time-limit and sending the prompt information for renewing the authorization time-limit to the vehicle diagnosis device, if it is determined that the remaining validity period in the authorization period is less than the preset threshold.

In a specific embodiment, the authorization information further includes authorization version information of the vehicle diagnosis software corresponding to the vehicle type. The processor is configured to implement the following steps when executing a computer sub-program stored in the memory:
  determine whether there is a new version currently based on the authorization version information, after it is determined that a current account has a valid authorization of the vehicle diagnosis software corresponding to the vehicle type; and
  push version upgrade information to the vehicle diagnosis device, if there is a new version.

In a specific embodiment, the authorization information further includes version upgrade authority information of the vehicle diagnosis software corresponding to the vehicle type. The processor is configured to implement the following steps when executing a computer sub-program stored in the memory:
  determine whether there is version upgrade authority based on the version upgrade authority information; and
  push the version upgrade information to the vehicle diagnosis device, if it is determined that there is version upgrade authority.

In a specific embodiment, the authorization information further includes authorization version information of the vehicle diagnosis software corresponding to the vehicle type. The processor is configured to implement the following steps when executing a computer sub-program stored in the memory:
  receive a version upgrade request sent by the vehicle diagnosis device, after the authorization information is returned and it is determined that there is a new version based on the authorization version information; and
  send an installation package of a new version to the vehicle diagnosis device, for the vehicle diagnosis device to complete version upgrade.

In a specific embodiment, the authorization information further includes version upgrade authority information of the vehicle diagnosis software corresponding to the vehicle type. The processor is configured to implement the following steps when executing a computer sub-program stored in the memory:
  receive a version upgrade request sent by the vehicle diagnosis device, after it is determined that there is a new version of the vehicle diagnosis software currently based on the authorization version information and it is determined that the user has the version upgrade authority based on the version upgrade authority information; and
  send prompt information for applying for the version upgrade authority to the vehicle diagnosis device, if it is determined that there is no version upgrade authority.

In a specific embodiment, the processor is configured to implement the following steps when executing a computer sub-program stored in the memory:
  send an installation package of an authorized vehicle diagnosis software to the vehicle diagnosis device, for the vehicle diagnosis device to complete software configuration and then start the vehicle diagnosis software to diagnose the to-be-diagnosed vehicle, after it is determined that the user has the authorization.

In a specific embodiment, the processor is configured to implement the following steps when executing a computer sub-program stored in the memory:
  send a dynamic key to the vehicle diagnosis device, for the vehicle diagnosis device to pass security verification and start an authorized vehicle diagnosis software installed in the vehicle diagnosis device to diagnose the to-be-diagnosed vehicle, after it is determined that the user has the authorization.

In a specific embodiment, the processor is configured to implement the following steps when executing a computer sub-program stored in the memory:
  after it is determined that the user has the authorization, send authorization information to the vehicle diagnosis device, where the authorization information includes authorization time-limit information of the vehicle diagnosis software corresponding to the vehicle type, for the vehicle diagnosis device to diagnose the to-be-diagnosed vehicle after determining that the authorization time-limit is valid at current time and generate prompt information that the authorization time-limit has expired after determining that the authorization time-limit is invalid at the current time.

A device for diagnosing a vehicle is further provided in the present disclosure. The device includes:
  a memory is configured to store a computer program; and
  a processor is configured to execute the computer program to implement the following steps:
    acquire vehicle diagnosis request information of a user, where the vehicle diagnosis request information includes identity information of the user and a vehicle type;
    send the vehicle diagnosis request information to a server, for the server to determine whether the user has an authorization of vehicle diagnosis software corresponding to the vehicle type;
    receive authorization information returned by the server and diagnosing a to-be-diagnosed vehicle, if it is determined that the user has the authorization of the vehicle diagnosis software corresponding to the vehicle type; and
    receive prompt information returned by the server, and acquiring the authorization of the vehicle diagnosis software corresponding to the vehicle type based on the prompt information and then diagnose the to-be-diagnosed vehicle, if it is determined that the user does not have the authorization of the vehicle diagnosis software corresponding to the vehicle type.

In a specific embodiment, the processor is configured to implement the following steps when executing a computer sub-program stored in the memory:

after the authorization information returned by the server is received, complete software configuration based on an installation package of the vehicle diagnosis software sent by the server, to start the vehicle diagnosis software to diagnose the to-be-diagnosed vehicle, where the vehicle diagnosis software is deleted immediately after the vehicle diagnosis is finished.

In a specific embodiment, the processor is configured to implement the following steps when executing a computer sub-program stored in the memory:

after the authorization information returned by the server is received, start the vehicle diagnosis software provided at time of first authorization by the vehicle diagnosis device, to diagnose the to-be-diagnosed vehicle, where the vehicle diagnosis software is deleted after the authorization expires.

In a specific embodiment, the processor is configured to implement the following steps when executing a computer sub-program stored in the memory:

after the authorization information returned by the server is received, perform security verification based on a dynamic key sent by the server; and start the vehicle diagnosis software provided at time of first authorization by the vehicle diagnosis device, to diagnose the to-be-diagnosed vehicle, if the security verification is passed, where the dynamic key is deleted after the authorization expires.

In a specific embodiment, the processor is configured to implement the following steps when executing a computer sub-program stored in the memory:

parse the returned authorization information, to determine whether the vehicle diagnosis software of the vehicle diagnosis device is of a latest version, if the user has the authorization of the vehicle diagnosis software corresponding to the vehicle type;

diagnose the to-be-diagnosed vehicle based on the returned authorization information, if it is determined that the vehicle diagnosis software of the vehicle diagnosis device is of the latest version; and display, based on the returned authorization information, version recommendation information of the vehicle diagnosis software for a user to select, if it is determined that the vehicle diagnosis software of the vehicle diagnosis device is not of the latest version, and acquire and configure vehicle diagnosis software based on selection of the user, to diagnose the vehicle.

In a specific embodiment, the processor is configured to implement the following steps when executing a computer sub-program stored in the memory:

if the user does not have the authorization for the vehicle diagnosis software corresponding to the vehicle type, receive prompt information returned by the server; and display version recommendation information of the vehicle diagnosis software based on the returned prompt information and the vehicle type, for the user to select to acquire the authorization.

Method, system, and device for diagnosing a vehicle, and server according to the present disclosure are described in detail above. Specific examples are used herein to describe the principles and implementations of the present disclosure. The description of the above embodiments is only used to help understand the method and core ideas of the present disclosure. It should be noted that those ordinary skilled in the art may also make several improvements and modifications to the present disclosure without departing from the principles of the present disclosure, and these improvements and modifications also fall within the protection scope of the claims of the present disclosure.

The invention claimed is:

1. A method for diagnosing a vehicle, applied to a server, and comprising:

receiving vehicle diagnosis request information sent by a terminal connected to the vehicle, wherein the vehicle diagnosis request information comprises identity information of a user and a vehicle type of the vehicle;

determining whether the user has an authorization of vehicle diagnosis software installed in the terminal corresponding to the vehicle type, based on the identity information of the user;

returning authorization information, for the terminal to diagnose the vehicle by using the vehicle diagnosis software corresponding to the vehicle type, if it is determined that the user has the authorization of the vehicle diagnosis software corresponding to the vehicle type; and returning prompt information to prompt the user to acquire the authorization of the vehicle diagnosis software corresponding to the vehicle type and then to diagnose the vehicle by using the vehicle diagnosis software corresponding to the vehicle type, if it is determined that the user does not have the authorization of the vehicle diagnosis software corresponding to the vehicle type, wherein the authorization information comprises authorization time-limit information of the vehicle diagnosis software corresponding to the vehicle type, for the terminal to diagnose the vehicle by using the vehicle diagnosis software corresponding to the vehicle type after determining that authorization time-limit is valid at current time, and generate prompt information indicating that the authorization time-limit has expired after determining that the authorization time-limit is not valid at the current time.

2. The method for diagnosing a vehicle according to claim 1, wherein the determining whether the user has an authorization of vehicle diagnosis software installed in the terminal corresponding to the vehicle type comprises:

acquiring an authorization record of the server;

determining whether the identity information of the user and the vehicle type match the authorization record;

determining that the user has the authorization of the vehicle diagnosis software corresponding to the vehicle type, if it is determined that the identity information of the user and the vehicle type match the authorization record; and determining that the user does not have the authorization of the vehicle diagnosis software corresponding to the vehicle type, if it is determined that the identity information of the user and the vehicle type do not match the authorization record.

3. The method for diagnosing a vehicle according to claim 2, wherein the authorization record comprises authorization time-limit information of the vehicle diagnosis software corresponding to the vehicle type, and wherein after determining that the user has the authorization of the vehicle diagnosis software corresponding to the vehicle type, the method further comprises:

determining whether an authorization time-limit is valid at current time;

determining that the user has the authorization of the vehicle diagnosis software corresponding to the vehicle type, if it is determined that the authorization time-limit is valid at the current time; and generating prompt information indicating that the authorization time-limit has expired and sending the prompt information indicating that the authorization time-limit has expired to the terminal, if it is determined that the authorization time-limit is not valid at the current time.

4. The method for diagnosing a vehicle according to claim 3, wherein after determining that the authorization time-limit is valid at the current time, the method further comprises:

determining whether a remaining validity period of the authorization time-limit is less than a preset threshold; and generating prompt information for renewing the authorization time-limit and sending the prompt information for renewing the authorization time-limit to the terminal, if it is determined that the remaining validity period of the authorization time-limit is less than the preset threshold.

5. The method for diagnosing a vehicle according to claim 2, wherein the authorization information further comprises authorization version information of the vehicle diagnosis software corresponding to the vehicle type, and wherein after determining that the user currently using the terminal has a valid authorization of the vehicle diagnosis software corresponding to the vehicle type, the method further comprises:

determining whether there is a new version currently, based on the authorization version information; and pushing version upgrade information to the terminal, if there is a new version currently.

6. The method for diagnosing a vehicle according to claim 5, wherein the authorization information further comprises version upgrade authority information of the vehicle diagnosis software corresponding to the vehicle type, and wherein the pushing version upgrade information to the terminal comprises:

determining whether there is version upgrade authority based on the version upgrade authority information;

pushing the version upgrade information to the terminal, if it is determined that there is version upgrade authority; or sending prompt information for applying for the version upgrade authority to the terminal, if it is determined that there is no version upgrade authority.

7. The method for diagnosing a vehicle according to claim 6, wherein after the pushing the version upgrade information to the terminal, the method further comprises:

receiving a version upgrade request sent by the terminal; and sending an installation package of the new version to the terminal, for the terminal to complete version upgrade.

8. The method for diagnosing a vehicle according to claim 6, wherein after sending prompt information for applying for the version upgrade authority to the terminal, the method further comprises:

receiving a version upgrade request sent by the terminal;
unlocking the version upgrade authority based on the version upgrade request; and
sending an installation package of the new version to the terminal, for the terminal to complete version upgrade.

9. The method for diagnosing a vehicle according to claim 1, wherein after determining that the user has the authorization of the vehicle diagnosis software corresponding to the vehicle type, the method further comprises:

sending an installation package of authorized vehicle diagnosis software to the terminal, for the terminal to complete software configuration and then start the vehicle diagnosis software to diagnose the vehicle.

10. The method for diagnosing a vehicle according to claim 1, wherein after determining that the user has the authorization of the vehicle diagnosis software corresponding to the vehicle type, the method further comprises:

sending a dynamic key to the terminal, for the terminal to pass security verification and then start authorized vehicle diagnosis software provided in the terminal to diagnose the vehicle.

11. A method for diagnosing a vehicle, applied to a terminal connected to the vehicle, and comprising:

acquiring vehicle diagnosis request information of a user, wherein the vehicle diagnosis request information comprises identity information of the user and a vehicle type of the vehicle;

sending the vehicle diagnosis request information to a server, for the server to determine whether the user has an authorization of vehicle diagnosis software installed in the terminal corresponding to the vehicle type;

receiving authorization information returned by the server and diagnosing the vehicle by using the vehicle diagnosis software corresponding to the vehicle type, if it is determined that the user has the authorization of the vehicle diagnosis software corresponding to the vehicle type; or receiving prompt information returned by the server if it is determined that the user does not have the authorization of the vehicle diagnosis software corresponding to the vehicle type, and acquiring the authorization of the vehicle diagnosis software corresponding to the vehicle type based on the prompt information and then diagnosing the vehicle by using the vehicle diagnosis software corresponding to the vehicle type, wherein the authorization information comprises authorization time-limit information of the vehicle diagnosis software corresponding to the vehicle type, for the terminal to diagnose the vehicle by using the vehicle diagnosis software corresponding to the vehicle type after determining that authorization time-limit is valid at current time, and generate prompt information indicating that the authorization time-limit has expired after determining that the authorization time-limit is not valid at the current time.

12. The method for diagnosing a vehicle according to claim 11, wherein after receiving the authorization information returned by the server, the diagnosing the vehicle by using the vehicle diagnosis software corresponding to the vehicle type further comprises:

completing software configuration based on an installation package of the vehicle diagnosis software sent by the server, so as to start the vehicle diagnosis software to diagnose the vehicle, wherein the vehicle diagnosis software is deleted immediately after vehicle diagnosis is finished.

13. The method for diagnosing a vehicle according to claim 11, wherein after receiving the authorization information returned by the server, the diagnosing the vehicle by using the vehicle diagnosis software corresponding to the vehicle type further comprises:

starting the vehicle diagnosis software provided at time of first authorization by the terminal, to diagnose the vehicle, wherein the vehicle diagnosis software is deleted after authorization expires.

14. The method for diagnosing a vehicle according to claim 11, wherein after receiving the authorization information returned by the server, the diagnosing the vehicle by using the vehicle diagnosis software corresponding to the vehicle type further comprises:

performing security verification based on a dynamic key sent by the server; and starting the vehicle diagnosis software provided at time of first authorization by the terminal, to diagnose the vehicle, in a case that the security verification is passed, wherein the dynamic key is deleted after authorization expires.

15. The method for diagnosing a vehicle according to claim 11, wherein if the user has the authorization of the vehicle diagnosis software corresponding to the vehicle type, the method further comprises:

parsing the returned authorization information, to determine whether the vehicle diagnosis software of the terminal is of a latest version;

diagnosing the vehicle by using the vehicle diagnosis software corresponding to the vehicle type based on the returned authorization information, if it is determined that the vehicle diagnosis software of the terminal is of the latest version; or displaying, based on the returned authorization information, version recommendation information of the vehicle diagnosis software for the user to select, if it is determined that the vehicle diagnosis software of the terminal is not of the latest version, and acquiring and configuring the vehicle diagnosis software based on selection of the user, to diagnose the vehicle by using the vehicle diagnosis software corresponding to the vehicle type.

16. The method for diagnosing a vehicle according to claim 11, wherein if the user does not have the authorization of the vehicle diagnosis software corresponding to the vehicle type, the method further comprises:

receiving the prompt information returned by the server; and displaying version recommendation information of the vehicle diagnosis software based on the returned prompt information and the vehicle type, for the user to select to acquire authorization.

17. A system for diagnosing a vehicle, comprising:

a terminal connected to the vehicle, configured to: acquire vehicle diagnosis request information of a user, wherein the vehicle diagnosis request information comprises identity information of the user and a vehicle type of the vehicle; send the vehicle diagnosis request information to a server, for the server to determine whether the user has an authorization of vehicle diagnosis software installed in the terminal corresponding to the vehicle type; and receive authorization information or prompt information returned by the server, to diagnose the vehicle by using the vehicle diagnosis software corresponding to the vehicle type; and the server, configured to: receive the vehicle diagnosis request information sent by the terminal;

determine whether the user has the authorization of the vehicle diagnosis software corresponding to the vehicle type based on the identity information of the user; and return the authorization information or the prompt information, for the terminal to diagnose the vehicle by using the vehicle diagnosis software corresponding to the vehicle type, wherein the authorization information comprises authorization time-limit information of the vehicle diagnosis software corresponding to the vehicle type, for the terminal to diagnose the vehicle by using the vehicle diagnosis software corresponding to the vehicle type after determining that authorization time-limit is valid at current time, and generate prompt information indicating that the authorization time-limit has expired after determining that the authorization time-limit is not valid at the current time.

18. A server, comprising:

a memory, configured to store a computer program; and a processor, configured to execute the computer program to implement steps of the method for diagnosing a vehicle according to claim 1.

19. A device for diagnosing a vehicle, comprising:

a memory, configured to store a computer program; and a processor, configured to execute the computer program to implement steps of the method for diagnosing a vehicle according to claim 11.

* * * * *